United States Patent [19]

Coleman

[11] 4,251,735
[45] Feb. 17, 1981

[54] DUAL SPEED CONTROL CIRCUIT FOR POWER FLOW THROUGH AN INVERTER

[75] Inventor: Allen K. Coleman, Manchester, Conn.

[73] Assignee: United Technologies Corporation, Hartford, Conn.

[21] Appl. No.: 59,724

[22] Filed: Jul. 23, 1979

[51] Int. Cl.$^3$ ............................................... H02J 3/32
[52] U.S. Cl. ........................................ 307/46; 363/95; 307/66
[58] Field of Search ................... 307/44, 45, 46, 48, 307/66, 72, 87; 363/95, 96, 97

[56] References Cited

U.S. PATENT DOCUMENTS

| | | | |
|---|---|---|---|
| 3,461,374 | 8/1969 | Rhyne, Jr. | 363/96 |
| 3,551,778 | 12/1970 | Ekström | 363/96 X |
| 3,768,001 | 10/1973 | Thorborg | 363/96 X |
| 4,178,629 | 12/1979 | Allen et al. | 363/97 X |
| 4,186,434 | 1/1980 | Cowett, Jr. | 363/97 X |

Primary Examiner—Donald A. Griffin
Assistant Examiner—James L. Dwyer
Attorney, Agent, or Firm—Richard P. Lange

[57] ABSTRACT

A control circuit for a force-commutated inverter connected intermediate a regenerative DC power source and a power grid, the power source/inverter combination operative to supply AC electrical energy to, or receive AC electrical energy from or adjust the power factor of, the AC electrical energy of the power grid. The control circuit of the present invention varies the real power component and the reactive power component of the electrical energy flowing between the electrochemical cell and the power grid through the use of two feedback loops with separate time constants. The first feedback loop allows for the independent control of the magnitude and direction of both the real power component and the reactive power component of the AC electrical energy flowing to or from the power grid. The first feedback loop also has a relatively slow time constant so that the power flow between the DC source and the power grid is substantially unaffected by transients. The second feedback loop has a fast time constant for rapidly adjusting the effective magnitude and phase of the voltage waveform from the inverter to compensate for instantaneous or short duration voltage surges which periodically appear on the power grid.

8 Claims, 6 Drawing Figures

DUAL SPEED CONTROL CIRCUIT FOR POWER FLOW THROUGH AN INVERTER

BACKGROUND OF THE INVENTION

1. Field of the Invention

This invention relates to a control circuit for an electrochemical cell coupled to a power grid. More specifically, it involves a control circuit having a first feedback loop with a slow time constant to form respective real power and reactive power error control signals for adjusting the power flow between the electrochemical cell and the power grid, and a second feedback loop with a fast time constant which controls the magnitude and phase of the voltage waveform on the AC side of the inverter connected between the electrochemical cell and the power grid.

2. Description of the Prior Art

Power producing and power storing devices are of particular interest to utility companies who operate extensive power grids which deliver large amounts of AC electrical power through a complex transmission network. Many different types of devices are known for producing electrical energy, one being the electrochemical cell which produces DC power by electrochemical means. Before the electrical power from such a DC device can be introduced into a power grid, it must be converted to AC electrical power. An inverter is one device capable of such a power conversion and a typical inverter includes a number of high-current capacity solid state switches, such as thyristors, which are periodically transitioned by a control circuit between the conductive and nonconductive states. In turn, this action alternatively connects the positive and negative inputs from the electrochemical cell through the inverter causing AC electrical energy to be presented to the power grid of the electrical utility.

A particular problem associated with the use of electrochemical cells of the battery type as a DC power source is that in the production of large amounts of electrical energy on a long term basis, many batteries consume the active chemical components, making up the cell. As a result, unless regenerated from an outside source, the power-producing capability of such electrochemical cells decline rapidly.

A type of electrochemical cell is known as the fuel cell and produces DC electrical energy directly from the oxidation of a fuel from an external source; therefore, it is capable of providing AC electrical power on a sustained basis. Of course, in the same manner as with the battery type of cell, the DC electrical energy must be converted to AC electrical energy for use by the utility. In addition to acting as a source of electrical energy, certain types of electrochemical cells are also suitable for use as a power storing device, this capability existing primarily where the electrochemical cell is regenerative. Thus, the regenerative cells have the ability to convert the active chemical elements, either internally stored or from an external source, into DC electrical energy and also have the capability of utilizing the DC energy to form active chemical fuels for later use. This bidirectional ability allows the electrochemical cell to be used as a power source during periods of peak power consumption, but during periods of lower power consumption when excess electrical energy is available, the cell converts the excess electrical energy into active chemical elements which is stored for later use.

Of interest is U.S. Pat. No. 3,991,319 issued Nov. 9, 1972 to J. Servos et al for STANDBY POWER SUPPLY SYSTEM. The patent describes a standby power supply including an inverter utilizing a direct current power supply. Synchronizing circuitry is provided to assure the phase and amplitude match of the inverter output to the AC line when the standby power source is utilized. The synchronizing circuit includes a phase detector which receives a feedback signal from the inverter and also senses the AC line voltage. The output from the phase detector is presented through a phase feedback switch to a voltage controlled oscillator to vary the frequency and phase of the output signal. A limitation of this particular system is that it is not suitable for controlling the direction and magnitude of both real power and reactive power between the source and the load.

Also of interest is the copending application U.S. application Ser. No. 059,725 filed July 23, 1979 by the same applicant, and assigned to the same assignee as the present invention, which describes a method for controlling the magnitude and direction of power flow through an inverter which is itself connected between an electrochemical cell and a power grid.

SUMMARY OF THE INVENTION

A primary object of the present invention is to provide a control circuit for a force-commutated inverter connected to a regenerative power source, the combination of which can supply electrical energy to, or receive electrical energy from a power grid.

A particular feature of the present invention involves a control technique for adjusting the real power component and the reactive power component of electrical energy flowing between a regenerative power source and a power grid through the use of an inverter having a control circuit with a first feedback loop that has a relatively slow time constant so that the actual power factor between the regenerative source and the power grid is substantially unaffected by transients. However, the control circuit for the inverter also includes a second feedback loop having a fast time constant to rapidly adjust the effective magnitude and phase of the voltage waveform from the inverter by varying the precise firing points of the solid state switching elements in the inverter to compensate for the instantaneous or short duration voltage surges which can periodically appear in the power grid.

According to the present invention, an inverter control circuit includes a first feedback loop with a slow time constant to receive an adjustable input command signal indicating both the desired reactive power level and also the desired real power level of electrical energy flow between an electrochemical cell and a power grid. These signals are combined in the first feedback loop having a slow time constant with respective signals that are proportional to the sensed real power and reactive power to form a var error signal and a power error signal. The var power error signal is presented to a voltage controller located in the second feedback loop, this loop having a fast time constant for varying the control signals applied to the inverter to change the effective magnitude of the voltage waveform presented to the power grid. In a similar manner the real power error signal is presented to a second feedback loop with a fast time constant, but to a phase controller to adjust the control signal presented to the inverter for modifying the phase of the voltage waveform from the inverter relative to the power grid.

A particular feature of the present invention is that it includes an inverter with a control system that precisely tracks the magnitude and phase of the power grid, even when there is no energy flow between an electrochemical cell and a power grid, so that the electrochemical cell can be turned on, even at full power, without causing adverse transients in either the electrochemical cell or the power grid. In addition it allows the real power component and the reactive power component of energy flow to be rapidly changed as desired throughout the operating range of the electrochemical cell. This capability is, in part, due to the use of two separate feedback loops, one having a slow time constant and one having a fast time constant, which sense the voltage level of both the electrochemical cell and the power grid, the magnitude and direction of the real power and the reactive power and the phase of the voltage waveform on the power grid to, with the aid of an analytical model, construct what the inverter voltage waveform should be; this is then compared with the actual voltage waveform in the power grid and any errors therebetween are reflected in error signals. In turn, the error signals are used to adjust the firing angles of the solid state switches in the inverter to vary the either effective magnitude, or effective phase, or both, of the voltage waveform from the inverter as needed to cause it to track that of the power grid. Of course, any unanticipated deviation of the voltage waveform on the power grid, such as might be caused by transients, are sensed through the model and the inverter control signal is adjusted to vary the phase and magnitude of the inverter output waveform to compensate for such transients in the power grid.

Other objects, features and advantages of the present invention will become apparent in light of the following detailed description of a preferred embodiment as illustrated in the accompanying drawing.

DETAILED DESCRIPTION OF THE ILLUSTRATED EMBODIMENT

Figure 1:
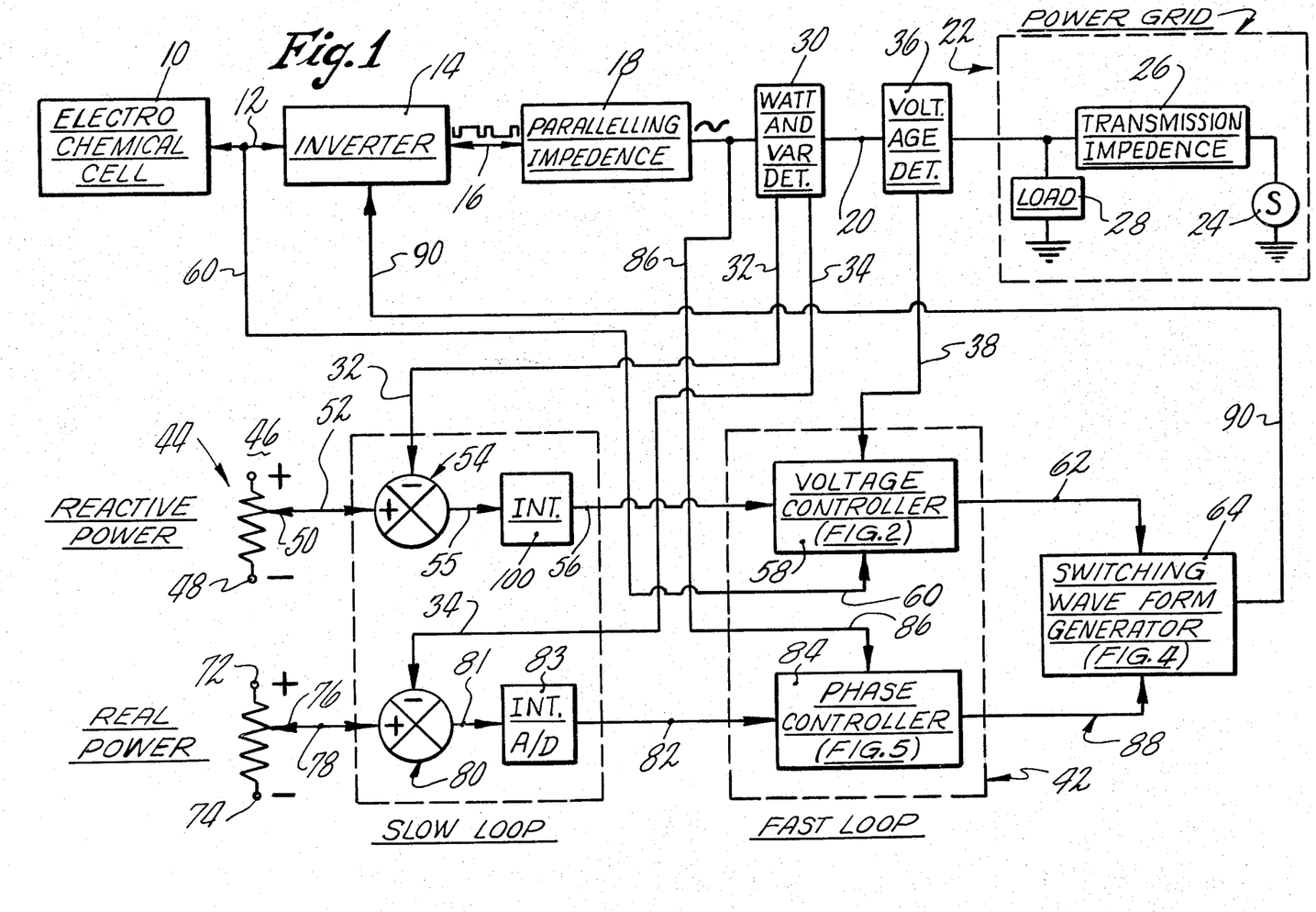
FIG. 1 is a schematic illustration in block diagram form of one embodiment of a control circuit for an inverter connected between an electrochemical cell and a power grid according to the present invention.

Referring initially to FIG. 1, there is seen one embodiment of a device for implementing the method according to the present invention. An electrochemical cell 10, such as a fuel cell or battery or other comparable DC device, is connected by a line 12 to a force-commutated inverter 14, the line 12 normally including a negative bus and a positive bus. It should be understood that although both force-commutated inverters and line-commutated inverters are known, the present invention applies primarily to the force-commutated type of inverter because its solid state switching elements are not dependent on the phase relationship of the voltage-current waveforms on the power grid 20 for turning off. The inverter 14 typically includes at least one or more pairs of switching elements, and by alternatively actuating these elements, the negative and positive input buses at the DC side are connected through the inverter to the AC side forming an AC signal which includes a fundamental signal together with numerous harmonics. The AC side of the inverter 14 is connected by a line 16 to a paralleling impedance 18 which may include a filter which is selected to pass signals of a frequency at which the AC electrical energy operates, normally 60 Hertz, and to reject signals outside of that frequency. The paralleling impedance 18 would also include any power transformer and harmonic cancellation reactor for conditioning the final AC waveform for presentation to the power grid 20. The other side of the filter 18 is connected by a line 20 to a power grid 22.

As is seen in FIG. 1, a power grid 22 typically includes at least one source of AC electrical energy 24, transmission impedance 26 which would include the impedance of the transmission line and also that of the source transmission line, and one or more loads 28, where electrical energy is consumed. However, the usual case is much more complex than the simple illustration in that most often there is a number of power sources together with a vast number of separate loads that can draw different amounts of AC electrical energy at different times, all of which are interconnected by transmission lines. In any event, the worst case has been illustrated here for the purposes of the present invention, that being where the load is immediately next to the inverter 14.

As is well known, there are many locations or separate points in a power grid at which it is desirable to control add or store real power, or just to adjust the local power factor. The circuit of the present invention affords an extremely high degree of flexibility in the control of these important parameters. Accordingly, the electrochemical cell 10 can be used as a source of energy during periods when the power grid 22 is experiencing high load or demand for electrical power but when there is an excess of power in the power grid 22, the direction of power flow can be reversed allowing energy to be stored in the electrochemical cell 10. In addition, it is also beneficial to be able to easily control the reactive power or vars (volts amps reactive) of the load to assist power factor adjustment at a specific situs of the power grid 22.

The present invention for the independent adjustment of both the magnitude and direction of electrical energy, and also the relative power factor thereof, will now be described in conjunction with one embodiment of a control circuit for the inverter 14 which is connected between the electrochemical cell 10 and one point of the power grid 22.

A power detector 30 is positioned in the line 20 to sense the magnitude and direction of both the real power flow and the reactive power flow between the electrochemical cell 10 and the power grid 22. In operation, the power detector 30 presents an output signal on the line 32 which is proportional to the magnitude and the direction of the reactive power or vars flowing in the line 20. In a similar manner, the power detector 30 presents on line 34 which is proportional to the magnitude and direction of the real power flowing in the line 20. A voltage detector 36 is also connected to the line 20 and presents a signal on a line 38 which is proportional to the magnitude of the voltage waveform on the line 20, this being both the fundamental component of the voltage waveform out of the inverter and also the voltage waveform existing on the power grid.

The control circuit of the present invention includes a first feedback loop 40 having a slow time constant or relatively long response time and a second feedback loop 42 having a short response time. The first feedback loop 40 includes an adjustable var command signal which is formed from a variable potentiometer 44 that has one terminal 46 coupled to a positive source of reference potential while the other terminal 48 is connected to a negative source of reference potential. The control terminal 50 presents a desired voltage level which can be adjusted over a suitable range over a line 52 to one input of a first comparator 54. The other input of the first comparator 54 is connected to the lead 32 to receive the signal which is proportional to the magnitude and direction of the reactive power flowing in the line 20. The first comparator 54 combines the var command signal on the line 52 differentially with the signal from the detector 30 indicating the actual magnitude and direction of reactive power and presents a var error signal at its output on the line 55 to an integrator 100. The integrator 100 effectively integrates the error over a time period of approximately one and one-half to two cycles of the voltage fundamental waveform and presents the integrated var error signal out of the second control loop via the line 56 to the voltage controller 58.

The voltage controller 58 is connected to the line 38 and the voltage sensor 36 for receiving a signal proportional to the magnitude of the AC voltage on the line 20; and, it is also connected to line 12 to sense the level of the DC voltage from the electrochemical cell 10. The voltage controller 58 compares a difference signal derived from the respective magnitudes of the output of the electrochemical cell 10 via line 60 and that on the line 20 and combines it with the var error signal received on the line 56 to form a control signal at its output on the line 62 which is presented to a switching waveform generator 64. The signal on the line 62 causes the switching waveform generator 64 to adjust the firing points of the semiconductor switches in the inverter 14 such that the effective voltage of the fundamental signal waveform out of the inverter is increased or decreased in proportion to the signal on the line 62.

Still referring to FIG. 1, the first feedback loop 40 also includes an adjustable power command signal which can be simply and easily formed by a variable potentiometer 70 which has one terminal 72 coupled to a positive source of reference potential while the other terminal 74 is connected to a negative source of reference potential. The control terminal 76 presents a voltage level which can be varied over a suitable range to a line 78 and one input of a second comparator 80. The other input of the comparator 80 is connected to the line 34 for receiving a signal that is proportional to the magnitude and direction of the real power flowing in the line 20. The second comparator 80 creates a real power error signal at its output on the line 81 by differentially combining the power command signal with the sensed signal on the line 34 and presents this signal via the line 81 to the A/D integrator 83. The A/D integrator 83 integrates the error signal over a time period of approximately one and one-half to two cycles of the voltage fundamental waveform and presents the integrated real power error signal via a line 82 to the phase controller 84. The phase controller 84 is also coupled by line 86 to the line 20 for sensing the phase of the AC signal on the line 20 and provides a phase offset therefrom in proportion to the input signal on the line 82 at its output on the line 88. The switching waveform generator 64 is connected to the line 88 and combines this phase offset waveform signal with the voltage control signal received on the line 62 to provide a control signal at its output on the line 90 which is presented to the inverter 14.

Figure 2:
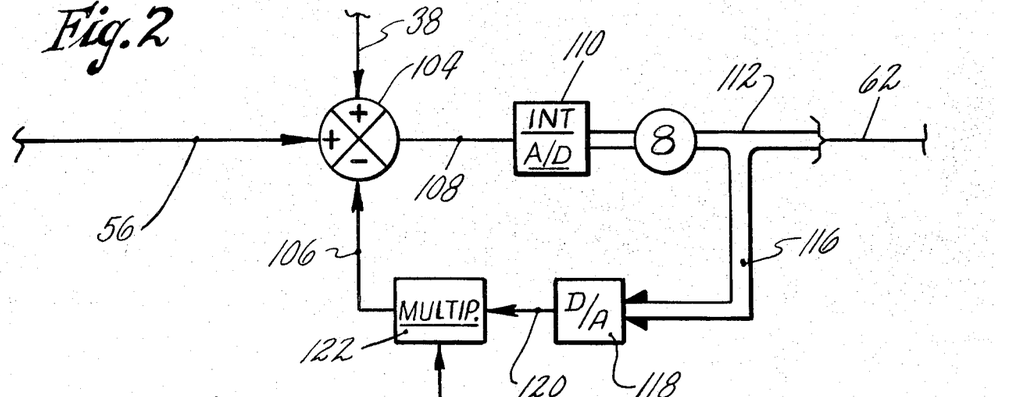
FIG. 2 is a schematic illustration of one embodiment of the voltage controller located in the fast feedback loop depicted in FIG. 1.

Referring now to FIG. 2, there is seen one embodiment of the voltage controller 58 which is situated in the second feedback loop 42 and provides an output signal to the switching waveform generator 64 related to the desired effective magnitude of the voltage waveform from the inverter 14. As mentioned herebefore, the var error signal is received by the voltage controller on the line 56 from the first feedback loop 40 and this signal is proportional to the reactive power change, if any, to occur in the fundamental of the voltage waveform out of the inverter. The integrated reactive power error signal is first presented via a line 56 to one input of a comparator circuit 104. A second input of the comparator 104 receives a signal from the voltage sensor 36 connected to the line 38 which is proportional to the magnitude of the voltage level of the power grid. A third input of the comparator receives a feedback signal via the line 106 which is differentially combined with the signals on the other two inputs. The output signal from the comparator 104 is presented by line 108 to the input of a fast time constant integrating A/D unit which may be an eight bit device that effectively quantizes the error signal over approximately one-half cycle of the fundamental voltage waveform, or a time constant of about three microseconds. The digital error signal is then presented via a line 112, which may be an eight conductor data bus, to one input of the switching waveform generator 64. The voltage controller also includes a feedback section. This closed loop controller is relatively fast so that the input error, if any, can be fully reflected in a voltage change passed on to the gating waveform generator in about one-half of a cycle of the fundamental waveform of the power grid 22. Accordingly, the feedback includes a line 116, also an eight conductor data bus, which is connected to line 112 for feeding back the eight bit digital integrated error signal to the input of an eight bit D/A unit 118 which converts the digital information back into an analog level for presentation via a line 120 to one input of a multiplier 122. The other input of the multiplier 122 is connected via line 87 to receive a signal which is proportional to the DC level out of the electrochemical cell 10 and the control waveform generator 114.

Figure 3:
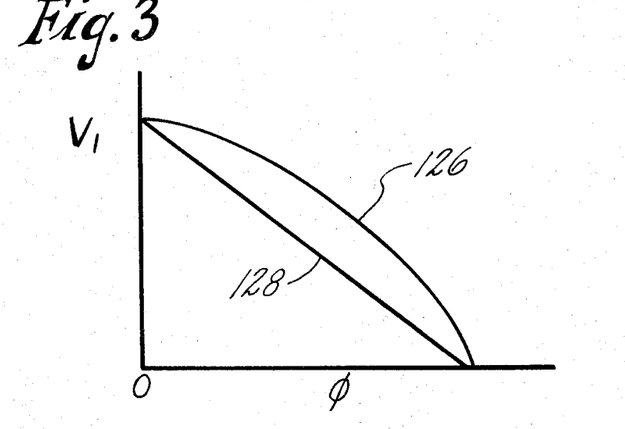
FIG. 3 is a graph illustrating the response characteristics of the multiplier circuit shown in FIG. 2.
Figure 4:
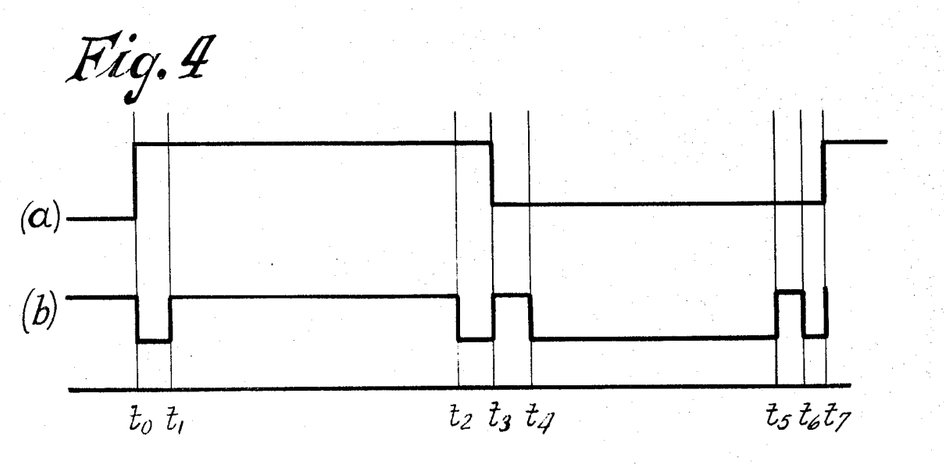
FIG. 4 is a graph showing a typical waveform out of the inverter.

The purpose of the multiplier 122 in conjunction with the lookup table unit (described hereinafter) in the switching waveform generator 64 is to linearly model the inverter source voltage presented on the line 16. This relationship might be best understood by referring to FIGS. 3 and 4 in addition to FIG. 2. Illustration (a) of FIG. 4 is a waveform whose time period $\tau$ is the same as the AC signal of the power grid 22, this essentially being the time period $t_0$–$t_7$. The waveform (b) of FIG. 4 depicts one of the numerous switching waveforms that could be used to transition the switches in the inverter 14 between the conducting and nonconducting state to form an output waveform having the desired fundamental component compatible with that of the power grid 22, such switching waveform patterns and the tradeoff being well known to those of ordinary skill. It should be also understood that in most situations the number of transitions per cycle, $t_0$–$t_7$, would most likely be greater than that shown in illustration (b), but for the purposes of simplicity and clarity in illustrating the control circuit of the present invention, an extremely simple switching pattern that might be used with only one inverter bridge has been illustrated. In a technique known as "end notching", the notch width at the ends of each half cycle (i.e. $t_0$–$t_1$, $t_2$–$t_3$, and $t_3$–$t_4$, etc.) is varied which in turn causes a change in the effective magnitude of the fundamental component out of the inverter. This condition is depicted in FIG. 3 which in essence illustrated the effective level of the voltage waveform out of the inverter, $V_1$, versus the width of the notch $\phi$ in degrees, e.g. $t_0$–$t_1$. The waveform 126 illustrates uncorrected conditions in that the effective voltage out of the inverter decreases as the width of the notch increases, but in a nonlinear manner. A feature of the present invention is that the control waveform generator 114 linearizes the feedback so that the signal presented to the third input of the combiner 104 on the line 106 responds as waveform 128 in FIG. 3. This helps ensure that the control system will not experience any oscillations or unanticipated transient conditions in operation.

Figure 5:
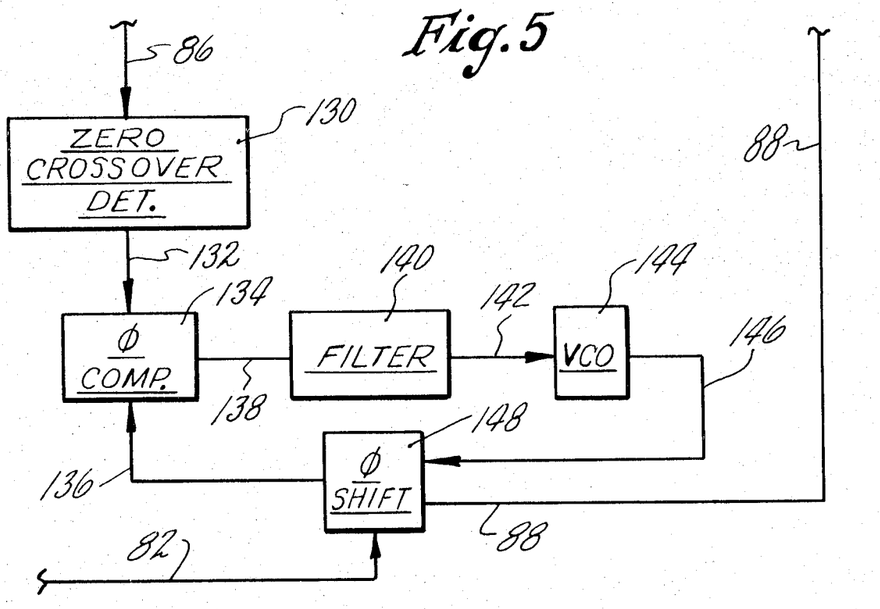
FIG. 5 is a schematic diagram of one embodiment of the phase controller shown in FIG. 1.

As briefly mentioned herebefore, a particular feature of the control circuit of the present invention is that it utilizes a real power error signal generated in the first feedback loop with a slow time constant which is presented to a phase controller disposed in a second feedback loop with a fast or short time constant that in turn varies the phase of the fundamental voltage waveform out of the inverter, one embodiment of the phase controller 84 which provides a phase offset proportional to the real power error signal will now be described. Referring to FIG. 5, the phase controller 84 receives the sinusoidal voltage waveform on the line 20 via the line 86 which is presented to a zero crossover detector 130. The zero crossover detector 130 senses the individual zero crossing points of the monotonic waveform of the voltage on the line 20 and presents a digital signal reflecting the same via the line 132 to one input of a phase comparator 134, which is located in a phase-locked loop. The phase comparator 134 combines the feedback signal on the line 136 with that corresponding to the power grid on the line 132 and feeds the output via a line 138 to a filter 140 which effectively integrates the pulses to provide a DC error signal at its output on the line 142. A VCO (voltage control oscillator) 144 receives this signal and provides a signal output on the line 146 to a phase shifter 148 having a frequency $f_0$ which is selected to be sufficiently high for obtaining the desired amount of phase resolution to control the main switching elements of the inverter. For example, if the power grid is operating at 60 Hertz and it is desired to have the phaselocked loop respond to variations as small as $\frac{1}{8}$ of an electrical degree, then $f_0$ for the VCO 144 is 172.8 kilohertz. The phase shifter 148 shifts the output waveform on the line 88 in a leading or lagging direction when compared to the input phase of the signal on the line 86 by an amount corresponding to the real power error signal received on the line 82. A more complete discussion of the operation of a phase controller circuit for providing a phase offset in an input circuit, together with a detailed embodiment of a phase shifter that could be used in place of the phase shifter 148, can be obtained by referring to the copending application patent Ser. No. 973,301 entitled PHASE ADJUSTMENT CIRCUIT filed on Dec. 26, 1978 by the present applicant.

Figure 6:
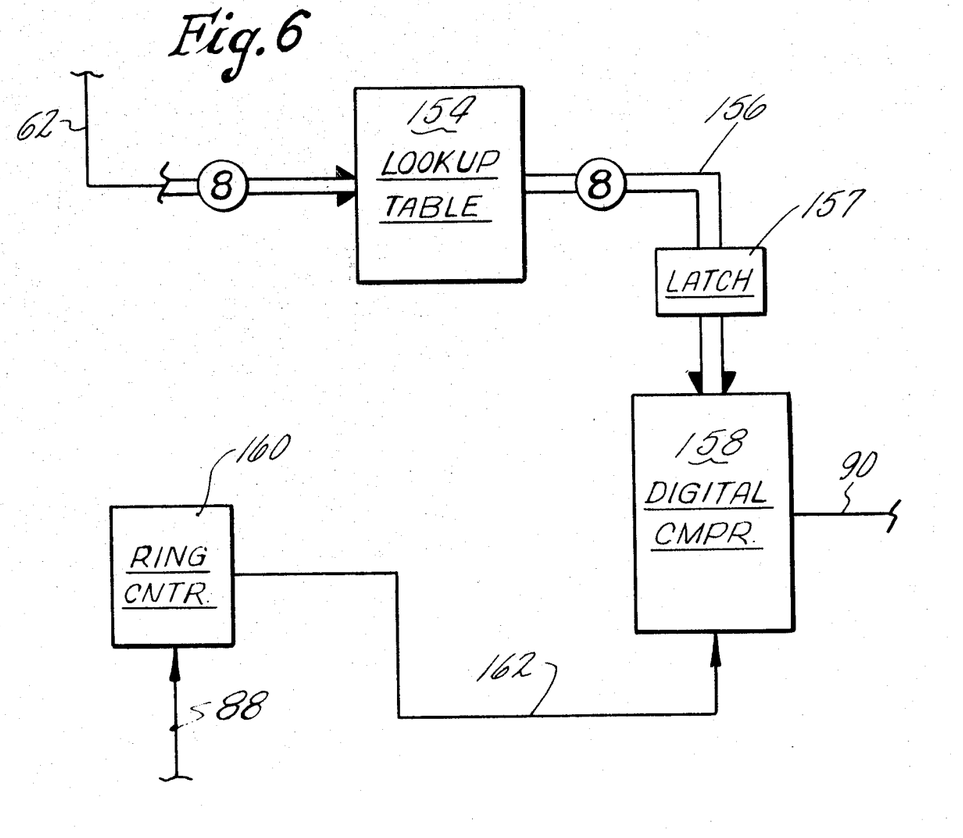
FIG. 6 is a schematic block diagram of one embodiment of the switching waveform generator shown in FIG. 1.

As mentioned herebefore, the switching waveform generator 64 responds to the voltage controller 58 to create a switching waveform pattern for the inverter main switching elements, normally thyristors or other solid state switches with a high current carrying capacity, that the output voltage waveform has a certain effective fundamental voltage. Also, the particular pattern is phase offset in proportion to the signal presented by the phase controller 84 to the voltage controller 58. Referring now to FIG. 6, one embodiment of a switching waveform generator 64 will now be described. The signal received on the line 62 from the voltage controller 58, such as via an eight line digital data bus, is presented to the input of a lookup table 154. The lookup table 154 has stored therein in digital format the predetermined width of each notch in the switching pattern waveform at which the thyristors of each bridge should be transitioned to create a voltage output waveform having the particular effective voltage magnitude. Accordingly, as recorded information is addressed by the eight bit words, an output is presented through a latch 157, which is dumped each half cycle of the fundamental frequency, to a digital comparator 158. Typically, there would be a digital comparator 158 for each pole in the inverter 14 but, for the purpose of simplicity, only one digital comparator has been shown in the embodiment of FIG. 6. The phase control signal presented to the switching waveform generator 64 via the line 88 is used as a control signal for a ring counter 160 whose output is a series of phase offset digital signals related to the fundamental waveform which are presented via the line 162 to the digital comparator 158. The digital comparator accordingly digitally combines the signal from the lookup table 154 indicating the notch width of the end notches with the phase displaced pulse train on the line 162 and provides a switching waveform for use by the pole, or poles, of the inverter. Finally, in accordance with this switching waveform pattern, the individual switching elements in the inverter are transitioned between the conducting and the nonconducting states.

Although the invention has been shown and described with respect to a preferred embodiment thereof, it should be understood by those skilled in the art that various changes and omissions in the form and detail thereof may be made without departing from the spirit and scope of the invention.

Having thus described typical embodiments of my invention, that which I claim as new and desire to secure by Letters Patent of the United States is:

1. A control circuit for an inverter which can be connected between an electrochemical cell and a power grid for electrical energy flow therebetween, comprising:

first feedback loop means having a relatively slow time constant for receiving an adjustable power command signal, said adjustable power command signal including a reactive power command signal and a real power command signal, which are indicative of desired electrical energy flow with said power grid, and for receiving sensed signals indicative of the actual electrical energy flow with the power grid, and for providing a power error signal in response thereto;

a second feedback loop means having a fast time constant for receiving said reactive power command signal and said real power command signal, and for sensing the phase of the signal waveform on said power grid, and for providing an output signal for varying the amplitude of the fundamental signal supplied to said power grid, and also for varying the phase of said fundamental signal to said power grid; and switching waveform generator means connected to said second feedback loop means for providing a switching waveform to aid inverter of a pattern adjusted in accordance with said power error signal thereby varying the power flow between said power grid and said electrochemical cell.

2. A control circuit for an inverter according to claim 1, wherein said first feedback loop means includes a first comparator means for receiving said reactive power command signal indicative of a desired magnitude and direction of reactive power flow of said electrical energy, and for combining said aforementioned signal with a signal indicative of the actual magnitude and direction of reactive power flow to said power grid, for providing a reactive power error signal to said second feedback loop means indicative of the difference between the reactive power command signal and the actual reactive power flowing to said power grid, and wherein said first feedback loop means also includes a second comparator means for receiving said real power command signal indicating a desired level of real power flow, and also for receiving a signal indicative of the actual electrical power flow and for providing an output signal indicating the difference between the desired power level and the actual power level.

3. A control circuit for an inverter according to claim 2, wherein said first feedback loop further includes a first integration means coupled to the output of said first comparator for integrating the reactive power error signal over a relatively long time period, and wherein said first feedback means also includes a second integrator connected to the output of said second comparator means for integrating the real power error signal over a relatively long time period.

4. A control circuit for an inverter according to claim 4, wherein said second feedback loop means includes a voltage controller for receiving said reactive power error signal and for providing an output signal to said switching waveform generator for changing the effective magnitude of the fundamental voltage out of said inverter.

5. A control circuit for an inverter according to claim 1, wherein said second feedback loop means includes a phase controller for receiving said real power error signal from said first feedback loop and also for receiving a signal proportional to the fundamental waveform of said power grid, and for providing a phase offset signal to said switching waveform generator in which the sensed signal has been offset by an amount proportional to the real power error signal received from said first feedback loop means.

6. A control circuit for an inverter according to claim 4, wherein said voltage controller comprises a comparator circuit having a first input for receiving the reactive power error signal from said first feedback loop means, and a second input for receiving a signal proportional to the effective amplitude of the voltage waveform of said power grid, and a third input for receiving a feedback signal, said comparator providing an output signal to an integrating A/D means which integrate the aforementioned signal over approximately one-half cycle of the fundamental waveform of said power grid, and means for feeding back a scaled version of the signal from said integrating means to said third output of said comparator.

7. A control circuit for an inverter according to claim 5, wherein said phase controller includes a detector means for providing a signal corresponding to the zero crossover point of said voltage waveform of said power grid, and further including a phase comparison means responsive to the signal from said detector means and also responsive to a feedback signal for providing an error signal proportional to any phase difference between the zero crossover signal and the feedback signal, and further including a voltage controlled oscillator means connected to the output of said phase comparison means for providing an output signal whose frequency is proportional to the magnitude of said phase error signal, and further including a phase shift means disposed in said feedback loop from the output of said voltage controlled oscillator means to said phase comparison means for phase shifting said feedback signal in response to the real power error signal received from said first feedback loop.

8. A control circuit for an inverter according to claim 1, wherein said switching waveform generator means includes a lookup table in which the notch width information of the end notches versus the effective amplitude of the switching waveform pattern is stored, and further including a ring counter means for providing a series of pulse trains related to the frequency of the fundamental out of said inverter, and wherein said switching waveform generator further includes a digital comparator means for receiving a series of pulse trains from said ring counter means and offsetting said series of pulse trains in accordance with said signal received from said lookup table.

* * * * *

UNITED STATES PATENT AND TRADEMARK OFFICE
CERTIFICATE OF CORRECTION

PATENT NO. : 4,251,735
DATED : February 17, 1981
INVENTOR(S) : ALLEN K. COLEMAN

It is certified that error appears in the above—identified patent and that said Letters Patent is hereby corrected as shown below:

Column 9, Claim 4, line 45, "4" should read -- 2 --

Signed and Sealed this

Eleventh Day of August 1981

[SEAL]

Attest:

GERALD J. MOSSINGHOFF

Attesting Officer          Commissioner of Patents and Trademarks

UNITED STATES PATENT AND TRADEMARK OFFICE
CERTIFICATE OF CORRECTION

PATENT NO. : 4,251,735
DATED : February 17, 1981
INVENTOR(S) : ALLEN K. COLEMAN

It is certified that error appears in the above-identified patent and that said Letters Patent is hereby corrected as shown below:

Column 7, line 22, change "control" to -- switching --

Column 7, line 23, change "114" to -- 64 --

Column 8, line 14, change "by" to -- from --

Column 8, line 14, delete "voltage controller 58" and
insert -- switching waveform generator --

Signed and Sealed this

Tenth Day of May 1983

[SEAL]

Attest:

GERALD J. MOSSINGHOFF

Attesting Officer

Commissioner of Patents and Trademarks